United States Patent [19]

Hieda

[11] Patent Number: 5,508,741
[45] Date of Patent: Apr. 16, 1996

[54] IMAGE PICKUP APPARATUS WITH PLURAL FILTERS JOINTLY RECEIVING IMAGE PICKUP SIGNALS TO PROVIDE LUMINANCE AND CONTOUR-RELATED INFORMATION

[75] Inventor: Teruo Hieda, Kanagawa, Japan

[73] Assignee: Canon Kabushiki Kaisha, Tokyo, Japan

[21] Appl. No.: 226,651

[22] Filed: Apr. 12, 1994

[30] Foreign Application Priority Data

Apr. 16, 1993 [JP] Japan .................................. 5-113879

[51] Int. Cl.[6] .............................. H04N 9/04; H04N 5/21; H04N 5/208; H04N 9/64
[52] U.S. Cl. ........................ 348/252; 348/630; 348/643; 348/663
[58] Field of Search .................................. 348/252, 630, 348/631, 253, 234, 235, 909.1, 643, 663, 625, 712, 708; H04N 9/04, 5/21

[56] References Cited

U.S. PATENT DOCUMENTS

| | | | |
|---|---|---|---|
| 4,887,252 | 12/1989 | Miyakawa et al. | 358/48 |
| 5,124,787 | 6/1992 | Lee et al. | 358/37 |
| 5,253,047 | 10/1993 | Machishima | 358/44 |
| 5,353,058 | 10/1994 | Takei | 348/363 |
| 5,386,249 | 1/1995 | Strolle et al. | 348/701 |

*Primary Examiner*—James J. Groody
*Assistant Examiner*—Nina N. West
*Attorney, Agent, or Firm*—Robin, Blecker, Daley and Driscoll

[57] ABSTRACT

In an image pickup apparatus having a low-pass filter for detecting a luminance component of an image pickup signal and a band-pass filter for detecting a contour component of the image pickup signal, a digital system for performing a digital signal processing action is arranged to have the low-pass filter and the band-pass filter not cascade-connected to each other. The arrangement is such that the signal processing action is performed without bringing about any spurious contour, any deterioration in frequency characteristic, etc., due to place cancelling peculiar to a digital system. The apparatus reduces the possibility of deterioration of images, permits simplification of circuit arrangement, permits reduction in electric energy consumption and in scale of the circuit, and thus facilitates adoption of an integrated circuit arrangement.

17 Claims, 12 Drawing Sheets

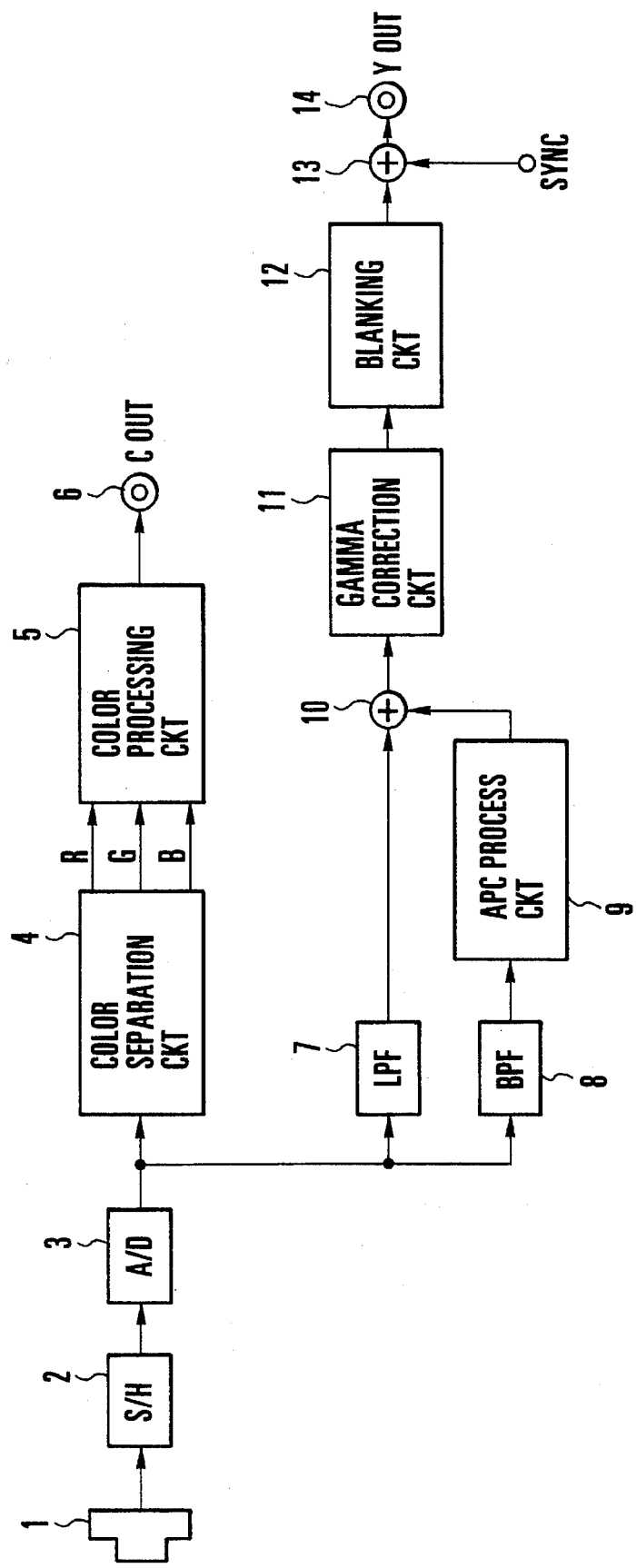

5,508,741

IMAGE PICKUP APPARATUS WITH PLURAL FILTERS JOINTLY RECEIVING IMAGE PICKUP SIGNALS TO PROVIDE LUMINANCE AND CONTOUR-RELATED INFORMATION

BACKGROUND OF THE INVENTION

1. Field of the Invention

This invention relates to an image pickup apparatus and more particularly to an image pickup apparatus arranged to process digital signals.

2. Description of the Related Art

A single-plate color image pickup method, i.e., a method of picking up a color image by means of a single solid-state image sensor which has minute color filters arranged on its image pickup plane has been well known.

According to this method, a luminance signal is first formed by removing a carrier component from a color signal outputted from the image sensor. A chrominance signal is formed by carrying out a synchronous detection process on the carrier component. The chrominance and luminance signals are processed separately from each other before a color image pickup signal is composed from them.

Reduction in size and increase in recording density of the image pickup apparatuses of the kind using the single-plate color image pickup method have progressed with the recent advancement of electronic technology. The advancement of semiconductor technology in particular has come to permit high speed analog-to-digital (hereinafter referred to as A/D) and digital-to-analog (hereinafter referred to as D/A) converters to be practical.

As a result, there have been proposed methods of converting the image pickup signal outputted from the image sensor which is a CCD or the like into a digital signal and carrying out a digital signal processing action on the digital signal using these A/D and D/A converters. According to these methods, the image pickup signal is A/D-converted and signal processing actions such as filtering, synchronous detection, gamma correction, matrixing, etc., are carried out. After these processes, the image pickup signal is outputted by D/A-converting it.

The conventional image pickup apparatus using the above-stated digital signal processing method has been arranged to carry out digital processes by using such circuits that had been adapted for analog processes as they are. Therefore, the conventional arrangement has caused the apparatus to have a large electric current consumption and a large circuitry, which is too large to be covered by a single integrated circuit and prevents reduction in cost. Further, the conventional image pickup apparatus has had its digital system not arranged apposite to a digital signal processing operation. As a result, there have occurred a spurious contour, deterioration of frequency characteristic, etc., due to a place cancelling phenomenon peculiar to digital systems.

SUMMARY OF THE INVENTION

In view of the problems mentioned above, it is an object of this invention to provide an image pickup apparatus which permits simplification of a digital signal processing circuit arrangement and gives images without causing any excessive amount of image deterioration.

Under this object, an image pickup apparatus according to this invention includes a first filter arranged to obtain a luminance signal by suppressing a chrominance component of a digital image pickup signal formed by A/D-converting a signal outputted from a color image sensor, and a second filter arranged to obtain a contour component of the digital image pickup signal. The second filter has a characteristic of suppressing the chrominance component and is arranged to receive the image pickup signal in a stage before the first filter.

It is another object of this invention to provide an image pickup apparatus including in combination a diaphragm arranged to control the quantity of light incident on a color image sensor, a carrier trap filter arranged to obtain a luminance signal by suppressing a chrominance component of a digital image pickup signal formed by A/D-converting a signal outputted from the color image sensor, and diaphragm control means for controlling the diaphragm to stabilize the level of the luminance signal by using an output of the carrier trap filter.

This invention is further characterized in that the above-stated carrier trap filter is arranged to be of a circulating type and to have its characteristic variable by varying a coefficient of circulation.

With the image pickup apparatus arranged in the above-stated manner according to this invention, a digital system for digital signal processing can be formed in such a manner that a low-pass filter provided for detection of a luminance component and a band-pass filter provided for detection of a contour component are not cascade-connected, so that signals can be processed without bringing about any spurious contour and any deterioration of frequency characteristic that tend to result from the place cancelling peculiar to a digital system.

The above and other objects and features of this invention will become apparent from the following detailed description of embodiments thereof taken in connection with the accompanying drawings.

BRIEF DESCRIPTION OF THE DRAWINGS

FIG. 1 is a block diagram showing an image pickup apparatus arranged according to this invention as a first embodiment thereof.

DETAILED DESCRIPTION OF THE PREFERRED EMBODIMENTS

Figure 2A:
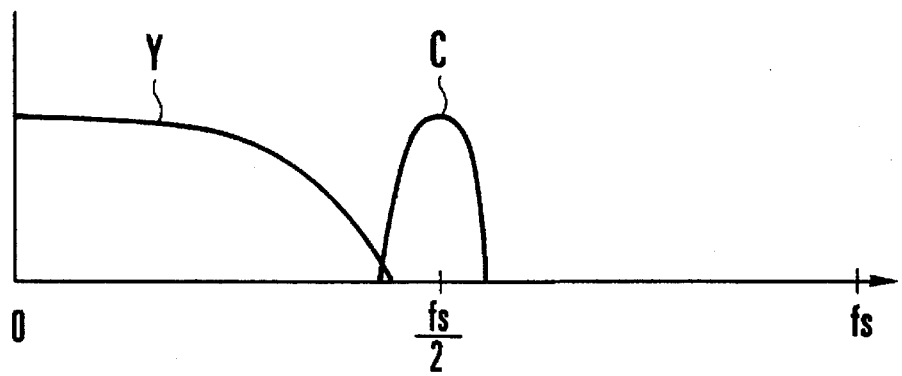
FIGS. 2(a), 2(b) and 2(c) show the operation of the image pickup apparatus shown in FIG. 1.

An image pickup apparatus which is arranged according to this invention is described below as a first embodiment thereof with reference to the drawings FIG. 1 shows the arrangement of the image pickup apparatus which is the first embodiment of this invention. Referring to FIG. 1, a color image sensor which is a CCD is provided with minute color filters formed on its image pickup plane. A sample-and-hold S/N circuit 2 is arranged to make the output of the CCD 1 into a continuous signal. Reference numeral 3 denotes an A/D converter. A color separation circuit 4 is arranged to separate color signals for red (R), for green (G) and for blue (B) from an image pickup signal. A color processing circuit 5 includes a gain adjustment part, a gamma circuit, a color-difference matrix which is arranged to form color-difference signals, a blanking circuit and a modulator which is arranged to modulate the color-difference signals with a color subcarrier and is arranged to form a chrominance signal C.

An output terminal 6 outputs the chrominance signal C. A low-pass filter 7 is arranged to form a luminance signal Y by suppressing a color carrier. A band-pass filter 8 is arranged to transmit a horizontal contour signal component. An APC process circuit 9 includes gain adjustment and base clip parts. The apparatus also includes an adder 10, a gamma correction circuit 11, a blanking circuit 12 and a synchronizing signal adder 13. An output terminal 14 outputs the luminance signal Y.

With the image pickup apparatus arranged in this manner as the first embodiment of this invention, an image of an object of shooting which is not shown is formed on the image pickup plane of the CCD 1 through an optical system which is not shown. The object image thus formed is photo-electrically converted and is converted into a digital image pickup signal by the sample-and-hold circuit 2. The digital image pickup signal thus formed is first inputted to the color separation circuit 4 to separate the R signal, the G signal and the B signal. The outputs of the color separation circuit 4 are supplied to the color processing circuit 5 to be subjected to various processes including a gain adjustment process, a gamma correction process, etc. Through these processes, color-difference signals R-Y and B-Y are formed. The color-difference signals R-Y and B-Y are subjected to a blanking process and are then modulated into a digital chrominance signal C, which is outputted from the output terminal 6. The output from the output terminal 6 is either digital-to-analog (D/A) converted by a D/A converter (not shown) and supplied to an external apparatus such as a TV set or a VTR or supplied as a digital color signal to some other apparatus having an input for a digital signal.

Meanwhile, the digital image pickup signal which is outputted from the A/D converter 3 is supplied also to the low-pass filter (LPF) 7 to obtain a luminance signal by removing a color carrier from the digital image pickup signal. Further, the digital image pickup signal is supplied also to the band-pass filter (BPF) 8 to obtain a signal for emphasizing a contour which is, for example, a signal of approximately 2 to 6 MHz. The signal thus taken out from the BPF 8 is supplied to the APC process circuit 9 to be subjected to gain adjustment and base clip processes. The output of the APC process circuit 9 is supplied to the adder 10 to be added to the luminance signal outputted from the LPF 7.

The output of the adder 10 is supplied to the gamma correction circuit 11 to be subjected to a gamma correction process. The output of the gamma correction circuit 11 is supplied to the blanking circuit 12 to be subjected to a blanking process. The output of the blanking circuit 12 is supplied to the synchronizing signal adder 13 to have a synchronizing signal added thereto. After that, the output of the synchronizing signal adder 13 is supplied to the output terminal 14 to be outputted to the outside as a digital luminance signal Y. The signal Y is then supplied to an external apparatus together with the above-stated digital chrominance signal.

Figure 2B:
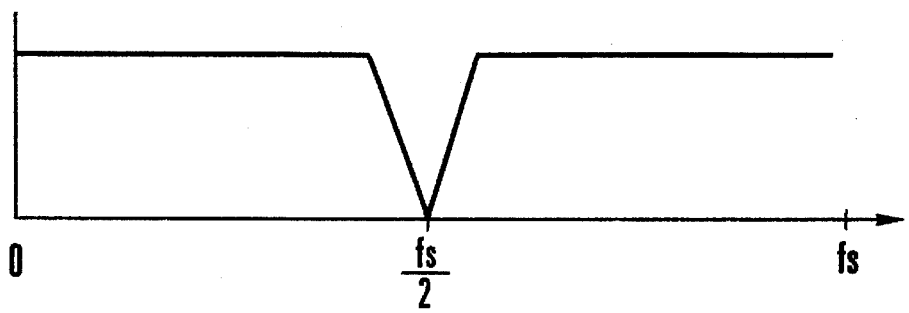
Figure 2C:
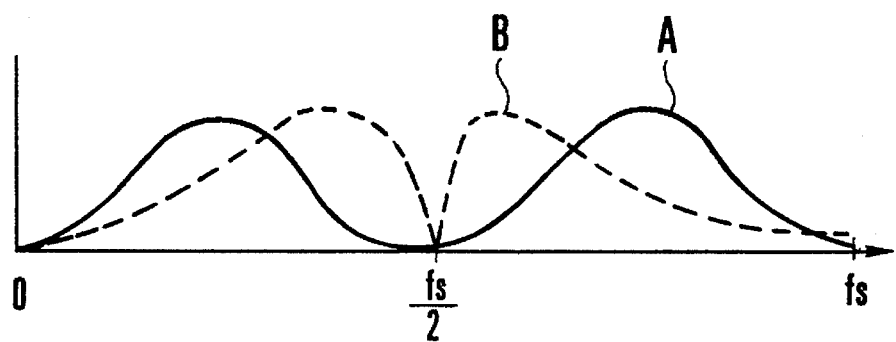

FIGS. 2(a), 2(b) and 2(c) show the operation of the image pickup apparatus shown in FIG. 1. In FIG. 2(a) which shows the spectrum of the signal outputted from the CCD 1, reference symbol fs denotes a frequency at which the CCD 1 is horizontally driven. The horizontal driving frequency fs also represents a sampling clock frequency for the A/D converter 3. The luminance signal Y which represents information on the luminance of the object is multiplexed with the component C of the color signal at a frequency determined by the arrangement of the minute color filters on the CCD 1. According to a method most popular at present, the repeating pitch of the minute color filters arranged on the CCD 1 covers two picture elements. Therefore, the center frequency of the chrominance component C of the color signal is fs/2.

FIG. 2(b) shows the frequency characteristic of the low-pass filter (LPF) 7. As shown, the low-pass filter 7 is arranged to have a characteristic by which the frequency fs/2 of the component C of the color signal is attenuated. In the event of a characteristic which allows a frequency above the frequency fs/2 to pass through, the chrominance component C is processed by the system clock fs in an aliasing manner.

FIG. 2(c) shows by way of example first and second frequency characteristics of the band-pass filter 8. The first frequency characteristic is shown by a full line and allows a relatively low frequency to pass through the band-pass filter 8. The second frequency characteristic is shown by a broken line and allows a relatively high frequency to pass. It is a common feature of both of the first and second frequency characteristics that the frequency fs/2 of the color component C of the color signal is attenuated by the band-pass filter 8.

Figure 3:
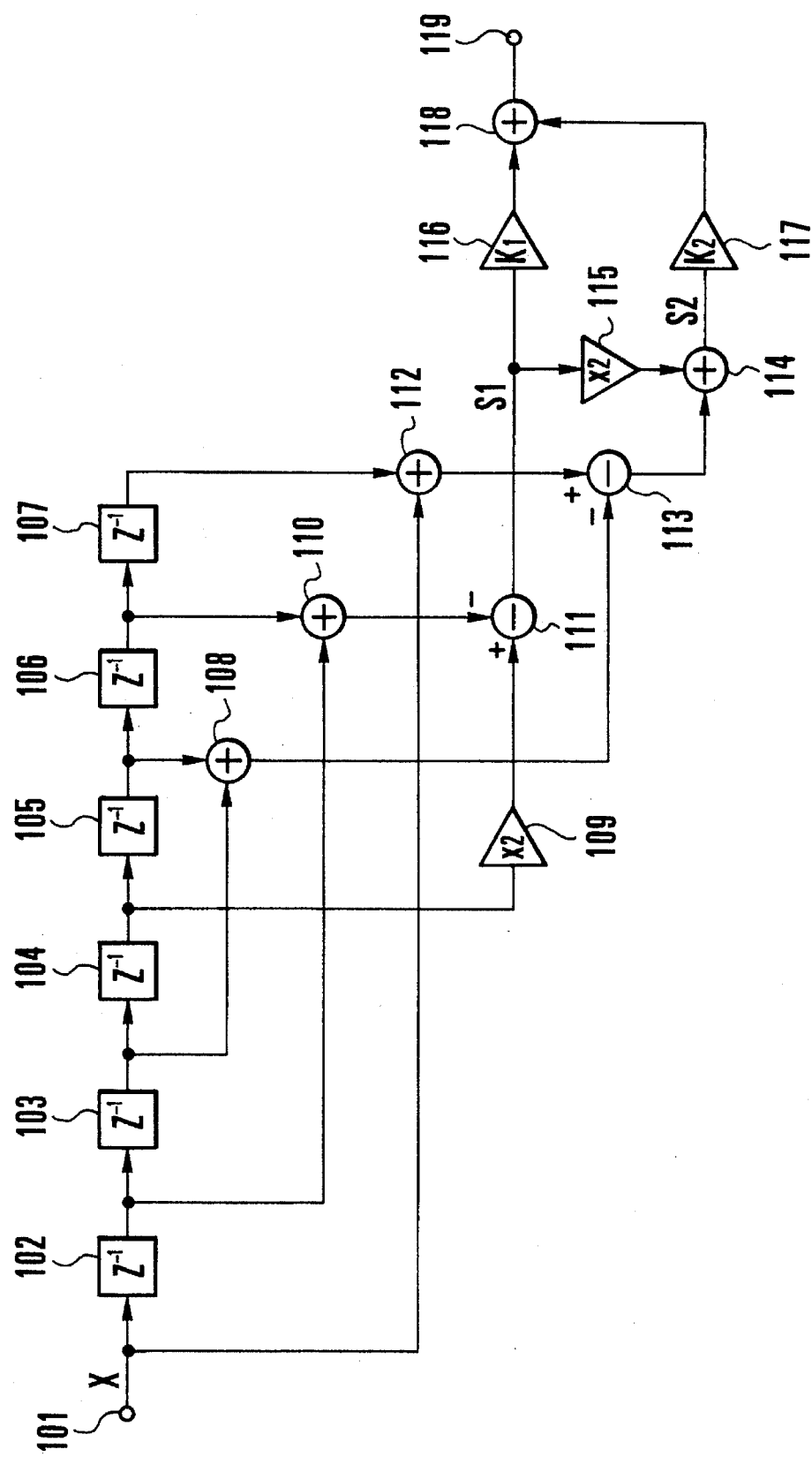
FIG. 3 shows by way of example the arrangement of a band-pass filter which is included in the image pickup apparatus of FIG. 1.

FIG. 3 shows the details of the band-pass filter 8 included in FIG. 1. The band-pass filter 8 has an input terminal 101, delay elements 102, 103, 104, 105, 106 and 107 which are composed of D-type flip-flops, etc., adders 108, 110, 112, 114 and 118, coefficient multipliers 109 and 115 which respectively have a coefficient value "2", subtracters 111 and 113, coefficient multipliers 116 and 117 which respectively have coefficients K1 and K2, and an output terminal 119.

With the band-pass filter 8 arranged in this manner, the digital image pickup signal inputted through the input terminal 101 is first delayed for a period of unit time by each of the delay elements 102, 103, 104, 105, 106 and 107 one after another. The output of the delay element 107 is added to the input signal by the adder 112. The outputs of the delay elements 102 and 106 are added together by the adder 110, and the outputs of the delay elements 103 and 105 are added together by the adder 108.

The output of the delay element 104 is multiplied by two by the coefficient multiplier 109. The output of the coefficient multiplier 109 is supplied to the subtracter 111. At the subtracter 111, the output of the adder 110 is subtracted from the output of the coefficient multiplier 109. The output of the subtracter 111 is supplied to the coefficient multiplier 116 to be multiplied by the coefficient K1. The output of the coefficient multiplier 116 is supplied to the adder 118 to be added to the output of the coefficient multiplier 117. The output of the adder 118 is outputted from the output terminal 119 to be supplied to the APC process circuit 9.

Meanwhile, the outputs of the adders 108 and 112 are supplied to the subtracter 113 to be subjected to a subtraction process. The result of subtraction is supplied to the adder 114. At the adder 114, the output of the subtracter 113 is added to a value obtained from the coefficient multiplier 115 by multiplying the output of the subtracter 111 by two. The output of the adder 114 is then supplied to the coefficient multiplier 117 to be multiplied by the coefficient K2. The output of the coefficient multiplier 117 is supplied to the adder 118 to be added to the output of the coefficient multiplier 116.

Referring to FIG. 3, with the input signal assumed to be X, the output signal of the subtracter 111 to be S1 and that of the adder 114 to be S2, the Z-transformation of the transfer functions H1 and H2 of these signals can be expressed by the following formulas:

$$H1(Z) = S1(Z)/X(Z) \quad (1)$$
$$= -Z^{-1} + 2 \cdot Z^{-3} - Z^{-5}$$
$$H2(Z) = S2(Z)/X(Z) \quad (2)$$
$$= 1 - 2 \cdot Z^{-1} - Z^{-2} + 4 \cdot Z^{-3} - Z^{-4} - 2 \cdot Z^{-5} + Z^{-6}$$

The frequency characteristics of these transfer functions can be obtained from the formulas by setting "Z" as follows:

$$Z = e^{j\omega\tau} \quad (3)$$

The characteristic obtained by carrying out a computing operation in accordance with these formula is about the same as the characteristic shown in FIG. 2(c).

Then, at the center frequency of the chrominance component f=fs/2, there is obtained the following:

$$Z = e^{jP} \quad (4)$$
$$= -1 \text{ (wherein } P\text{: circle ratio } (\pi))$$

Therefore, multiplication of Z by an odd number gives "−1" and multiplication of Z by an even number give "1". Then, the transfer functions H1 and H2 obtained by this can be expressed by the following formulas:

$$H1(-1) = 1 - 2 + 1 = 0 \quad (5)$$
$$H2(-1) = 1 + 2 - 1 - 4 - 1 + 2 + 1 = 0 \quad (6)$$

The frequency component fs/2 is, therefore, not transmitted.

In a case where the horizontal contour component detecting band-pass filter 8 is formed with an FIR filter by arranging it in the manner as shown in FIG. 3, the value of the transfer function can be easily arranged to be "0" with the Z-transfer function set at Z=−1. It is, therefore, not necessary to have any additional filter inserted for removal of a chrominance component.

Further, in the case of the arrangement shown in FIG. 3, the coefficient value "1" or "2" is used as a coefficient necessary for forming the filter circuit. However, the circuit can be formed without any coefficient multiplier in a case where the coefficient value "1" is used. In the event of the coefficient value "2", the circuit can be also formed without any coefficient multiplier by carrying out a shift computation with bit shifting. Therefore, the arrangement not only permits reduction in scale of the circuit but also eliminates the possibility of any deterioration of picture quality that otherwise tends to result from a coefficient error and place cancelling of the signal.

The coefficients usable in forming the filter circuit are not limited to those mentioned above. The amount of attenuation at the above-stated frequency fs/2 can be increased and the circuit scale can be reduced by using only a coefficient obtained from the coefficient value "1" or "2" to the power of an "n" number or a combination of two or three of such coefficients. It is also possible to vary the characteristic of the detected frequency of the horizontal contour signal by arranging the coefficient K1 or K2 to be variable, so that a characteristic suited for the object of shooting or shooting conditions can be obtained.

Figure 4:
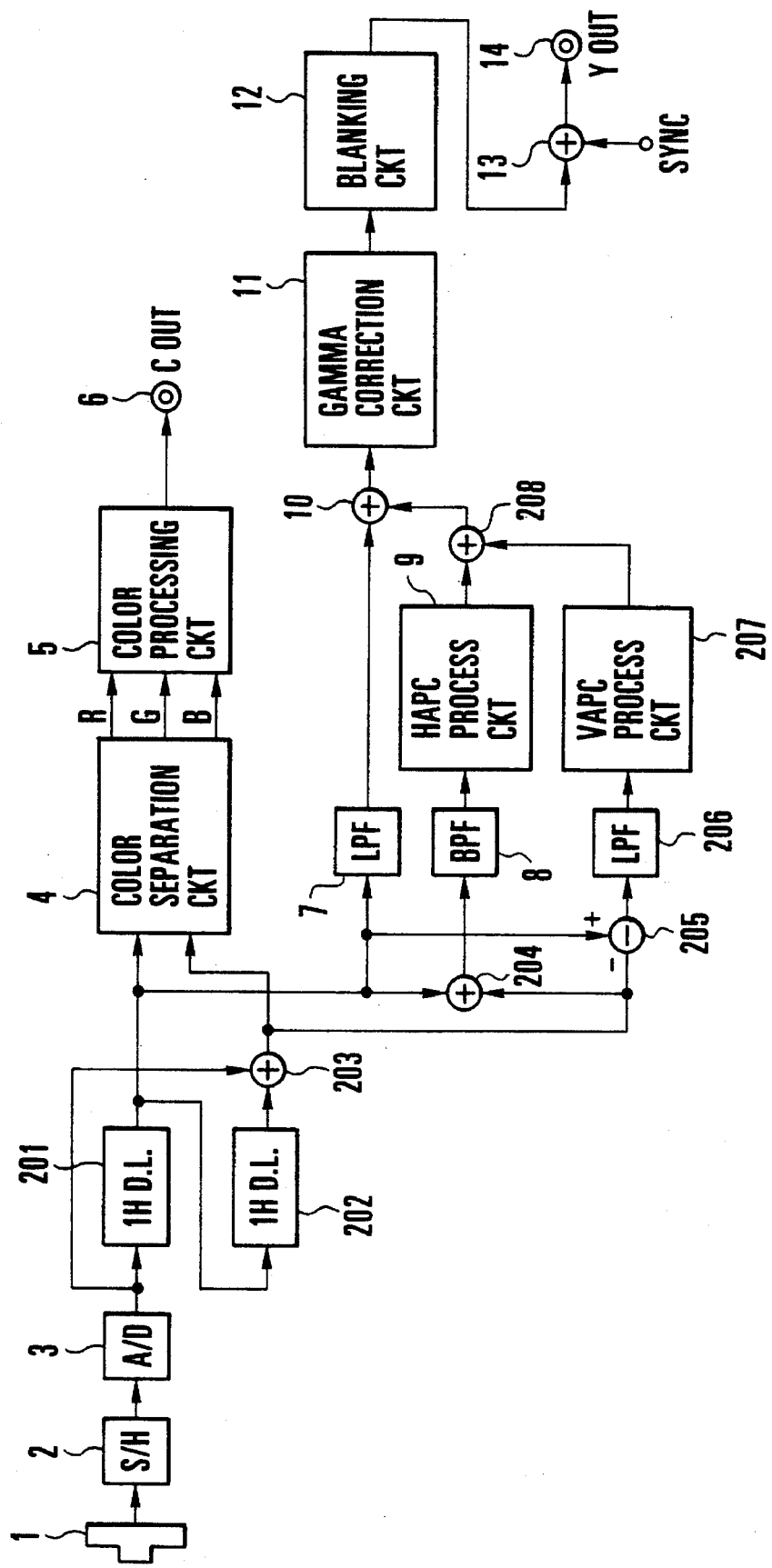
FIG. 4 is a block diagram showing an image pickup apparatus arranged according to this invention as a second embodiment thereof.

FIG. 4 shows an image pickup apparatus arranged as a second embodiment of this invention. In FIG. 4, reference numerals which are the same as those of FIG. 1 denote the same parts or parts corresponding to those of FIG. 1. The apparatus includes delay lines 201 and 202 which are respectively arranged to delay an input signal by one horizontal scanning period (hereinafter referred to as 1HDLs), adders 203, 204 and 208, a subtracter 205, a low-pass filter (LPF) 206 and a VAPC process circuit 207 which is arranged to receive a vertical contour component and to perform gain adjustment and base clip actions on the vertical contour component.

A digital image pickup signal outputted from the A/D converter 3 which is arranged in the manner as described in the foregoing is first delayed for one horizontal scanning period by the 1HDL 201. The output of the 1HDL 201 is inputted to the color separation circuit 4 and, at the same time, to the 1HDL 202 to be further delayed for another horizontal scanning period. The output of the 1HDL 202 is supplied to the adder 203 to be added to the output of the A/D converter 3. The output of the adder 203 is supplied to the color separation circuit 4. The color separation circuit 4, in the case of the second embodiment, is arranged to synchronously detect the two input signals, to form R, G and B signals and to output the digital color signals through the output terminal 6.

The output of the 1HDL 201 is supplied also to the low-pass filter (LPF) 7 to have a luminance component allowed to pass through the low-pass filter 7. The output of the low-pass filter 7 is added to a contour correction signal which is outputted from the adder 208. After that, a digital luminance signal Y is formed through the gamma correction circuit 11, the blanking circuit 12 and the synchronizing signal adder 13 in the same manner as in the case of the first embodiment described in the foregoing. The digital signal Y is outputted from the output terminal 14.

The output of the 1HDL 201 is supplied also to the adder 204 to be added to the output of the adder 203. The output of the adder 204 is supplied to the band-pass filter (BPF) 8 to have a horizontal contour component allowed to pass through the band-pass filter 8. The output of the band-pass filter 8 is supplied to the HAPC process circuit 9. At the HAPC process circuit 9, the horizontal contour component is subjected to gain adjustment and base clip actions and is thus made into a horizontal contour signal, which is supplied to the adder 208. The adder 208 then adds the horizontal contour signal to a vertical contour signal which will be described later to obtain a contour correction signal. The contour correction signal is then supplied to the adder 10 to be added to the output of the low-pass filter 7. Further, the output of the 1HDL 201 is supplied also to the subtracter 205 to be subtracted from the output signal of the adder 203.

The 1HDLs 201 and 202, the adders 203 and 204 and the subtracter 205 jointly form a vertical filter. In the vertical filter, the output of the adder 204 serves as a low-pass filter output in the vertical direction and the output of the subtracter 205 as a high-pass filter output in the vertical direction. Therefore, a contour component in the vertical direction is obtained from the output of the subtracter 205. The vertical contour component is supplied to the low-pass filter (LPF) 206 to have its low frequency component allowed to pass through the low-pass filter 206. The output of the low-pass filter 206 is supplied to the VAPC process circuit 207. At the VAPC process circuit 207, the output of the low-pass filter 206 is subjected to gain adjustment and base clip actions and is thus made into a vertical contour signal.

As mentioned above, the vertical contour signal is added to the horizontal contour signal by the adder 208 and is then further added by the adder 10 to the luminance signal which is outputted from the low-pass filter 7.

The frequency characteristic of the low-pass filter 206 is normally set at a cutoff frequency which is lower than the cutoff frequency of the low-pass filter 7 for the purpose of minimizing S/N ratio deterioration by reducing a noise included in the vertical contour signal. Further, this arrangement may be changed to omit the adder 203 by using only one 1HDL.

Figure 5:
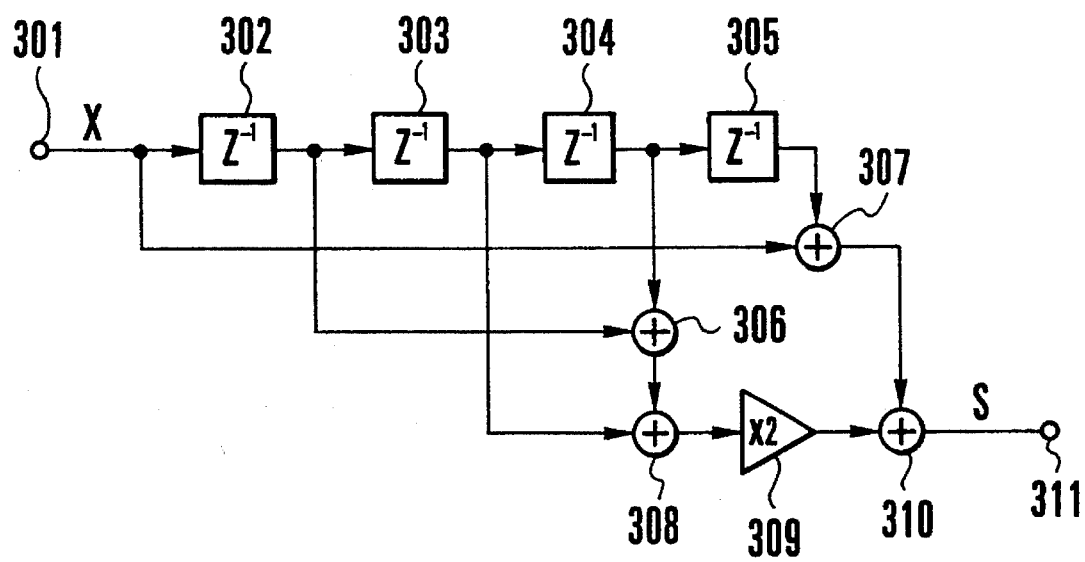
FIG. 5 shows by way of example the arrangement of a low-pass filter which is included in the image pickup apparatus of FIG. 4.

FIG. 5 shows by way of example the details of arrangement of the low-pass filter 206 which is included in the image pickup apparatus shown in FIG. 4. The low-pass filter 206 includes an input terminal 301, delay elements 302, 303, 304 and 305 which are similar to the delay elements 102, etc., shown in FIG. 3, adders 306, 307, 308 and 310, a coefficient multiplier 309 which has a coefficient value "2", and an output terminal 311.

With the low-pass filter 206 arranged in this manner, an input signal X inputted from the input terminal 301 is delayed by the delay elements 302, 303, 304 and 305 one after another. Among the outputs of these delay elements, the output of the delay element 305 is supplied to the adder 307 to be added to the input signal X. The outputs of the delay elements 302 and 304 are added together by the adder 306. The output of the adder 306 is supplied to the adder 308. At the adder 308, the output of the adder 306 is added to the output of the delay element 303. The output of the adder 308 is supplied to the coefficient multiplier 309 to be multiplied by two. The output of the coefficient multiplier 309 is supplied to the adder 310 to be added to the output of the adder 307. Further, the output signal S of the adder 310 is supplied to the adder 208 through the output terminal 311 as mentioned above.

In the case of this (second) embodiment, as described above, the S/N ratio of a horizontal contour signal is improved by obtaining a horizontal contour component from the output of the adder 204 which serves as the output of a vertical low-pass filter.

Figure 6:
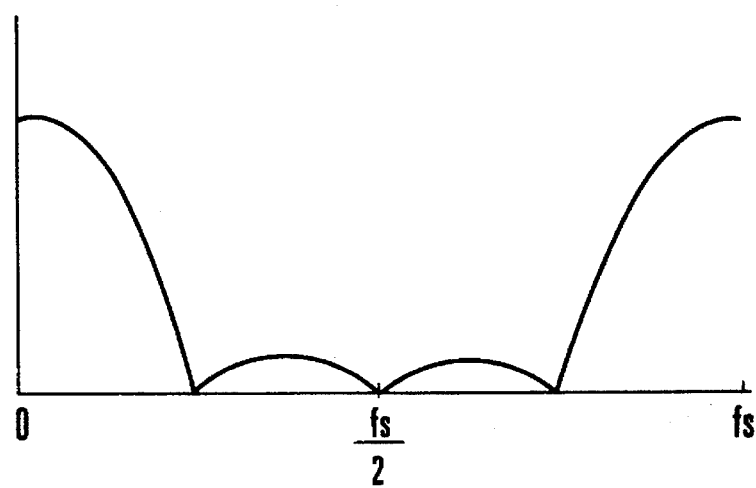
FIG. 6 shows the operation of the low-pass filter which is arranged as shown in FIG. 5.

FIG. 6 shows the frequency characteristic of the low-pass filter 206 which is arranged as shown in FIG. 5. Referring to FIG. 6, with the input signal of arrangement shown in FIG. 5 assumed to be X and the output signal of the adder 310 to be S, the Z-transformation of a transfer function H3 can be expressed by the following formula:

$$H3(Z) = S(Z)/X(Z) \quad (7)$$
$$= 1 + 2 \cdot Z^{-1} + 2 \cdot Z^{-2} + 2 \cdot Z^{-3} + Z^{-4}$$

When the frequency characteristic of this transfer function is obtained by setting $Z=e^{j\omega\tau}$ in the same manner as in the case of the first embodiment described in the foregoing, the frequency characteristic becomes as shown in FIG. 6.

Then, with the center frequency f of the chrominance component set at fs/2, the transfer function H3 is obtained by setting $Z=-1$ in the same manner as in the case described in the foregoing as expressed below:

$$H3(-1)=1-2+2-2+1=0 \quad (8)$$

Therefore, the frequency component of fs/2 is not transmitted.

The arrangement to form the low-pass filter 206 with an FIR filter for a vertical contour signal as shown in FIG. 5 obviates the necessity of inserting any special filter for removal of a chrominance component, because the value of the transfer function can be made into zero without difficulty by setting $Z=-1$ as described above. Further, by selecting a coefficient also in the same manner as in the case of the band-pass filter 8 described in the foregoing, signal deterioration can be minimized.

Figure 7:
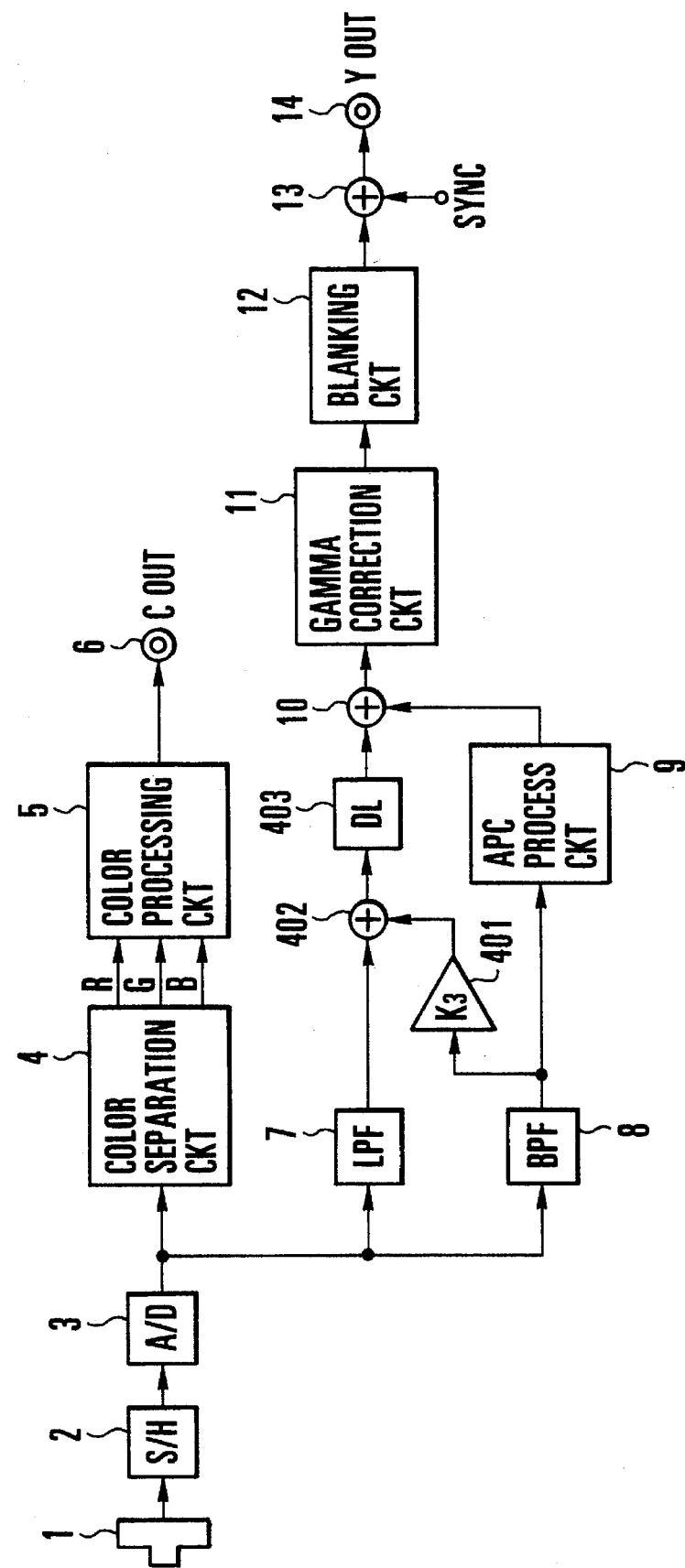
FIG. 7 is a block diagram showing an image pickup apparatus arranged according to this invention as a third embodiment thereof.

Next, an image pickup apparatus which is arranged according to this invention as a third embodiment thereof is described with reference to FIG. 7. Referring to FIG. 7, the third embodiment includes, besides the elements of the first embodiment shown in FIG. 1, a coefficient multiplier 401 which has a coefficient K3, an adder 402 and a delay line 403 which is provided for time adjustment. The main actions of the image pickup apparatus arranged as the third embodiment are performed in the same manner as the first embodiment.

Namely, the output of the band-pass filter 8 is supplied to the APC process circuit 9 and also to the coefficient multiplier 401. The coefficient multiplier 401 multiplies the output of the band-pass filter 8 by the coefficient K3. The output of the coefficient multiplier 401 is supplied to the adder 402 to be added to the output of the low-pass filter 7. The output of the adder 402 is delayed by the delay line 403 for a predetermined period of time to make the timing of it the same as that of the output of the APC process circuit 9. The output of the delay line 403 is supplied to the adder 10 to be added to a contour correction signal which is outputted from the APC process circuit 9.

Figure 8A:
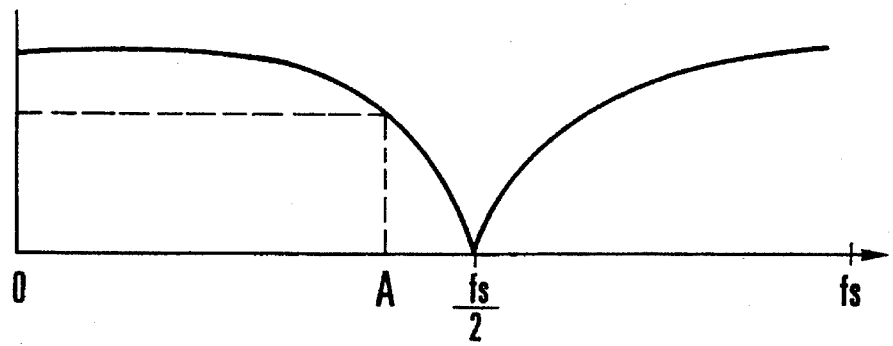
FIGS. 8(a), 8(b) and 8(c) show the operation of the image pickup apparatus shown in FIG. 7.
Figure 8B:
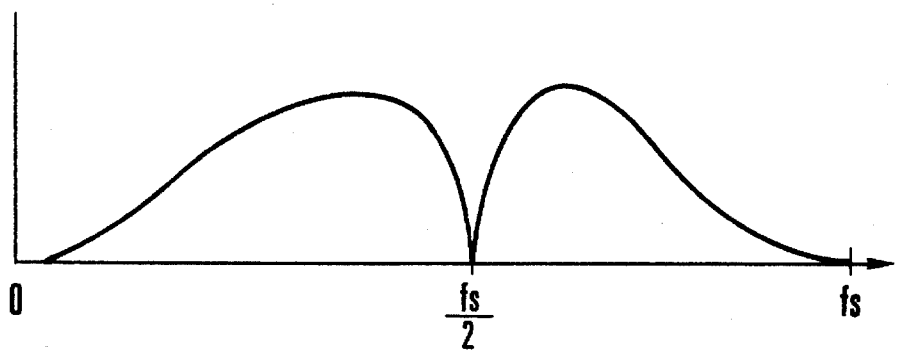
Figure 8C:
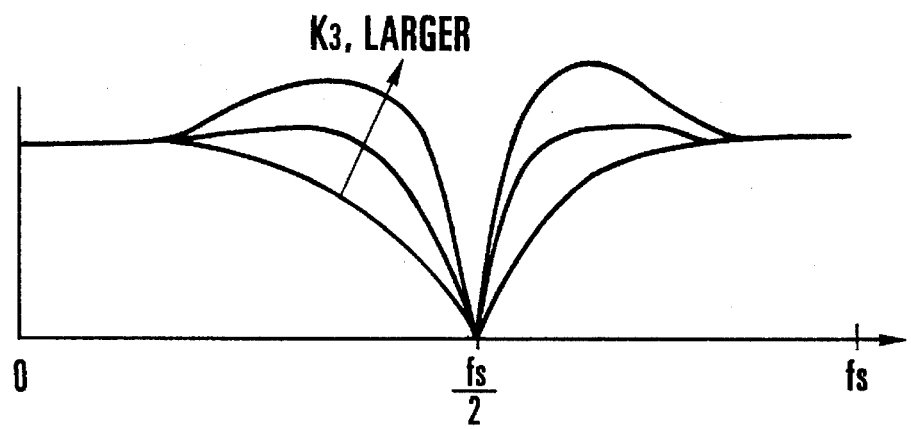

FIGS. 8(a), 8(b) and 8(c) are waveform charts showing the operation of the image pickup apparatus of FIG. 7. FIG. 8(a) shows the frequency characteristic of the low-pass filter 7. In a case where the low-pass filter 7 is arranged to have a relatively low degree, if the amount of suppressing the center frequency fs/2 of the chrominance component of a digital image pickup signal is arranged to be large, the gain of a high frequency signal component decreases, thereby lowering the resolution of the image. The gain becomes low at a point A as shown in FIG. 8(a).

FIG. 8(b) shows the frequency characteristic of the band-pass filter 8. As shown, the characteristic is emphasized at a part immediately before the center frequency fs/2. FIG. 8(c) shows the frequency characteristic of the digital image pickup signal processed until it is outputted from the adder 402. As apparent from FIG. 8(c), the characteristic changes in the neighborhood of the center frequency fs/2 to a greater degree accordingly as the value of the coefficient K3 increases. Therefore, the characteristic can be arranged to adequately compensate for a drop in the high frequency component of the luminance signal by setting the coefficient K3 at a suitable value.

Compared with the first embodiment shown in FIG. 1 and the second embodiment shown in FIG. 4, the arrangement of the third embodiment shown in FIG. 7 permits the low-pass filter 7 to be simply arranged to have a lower degree and yet enables the image pickup apparatus to have no deterioration in the frequency characteristic of the luminance signal.

Figure 9:
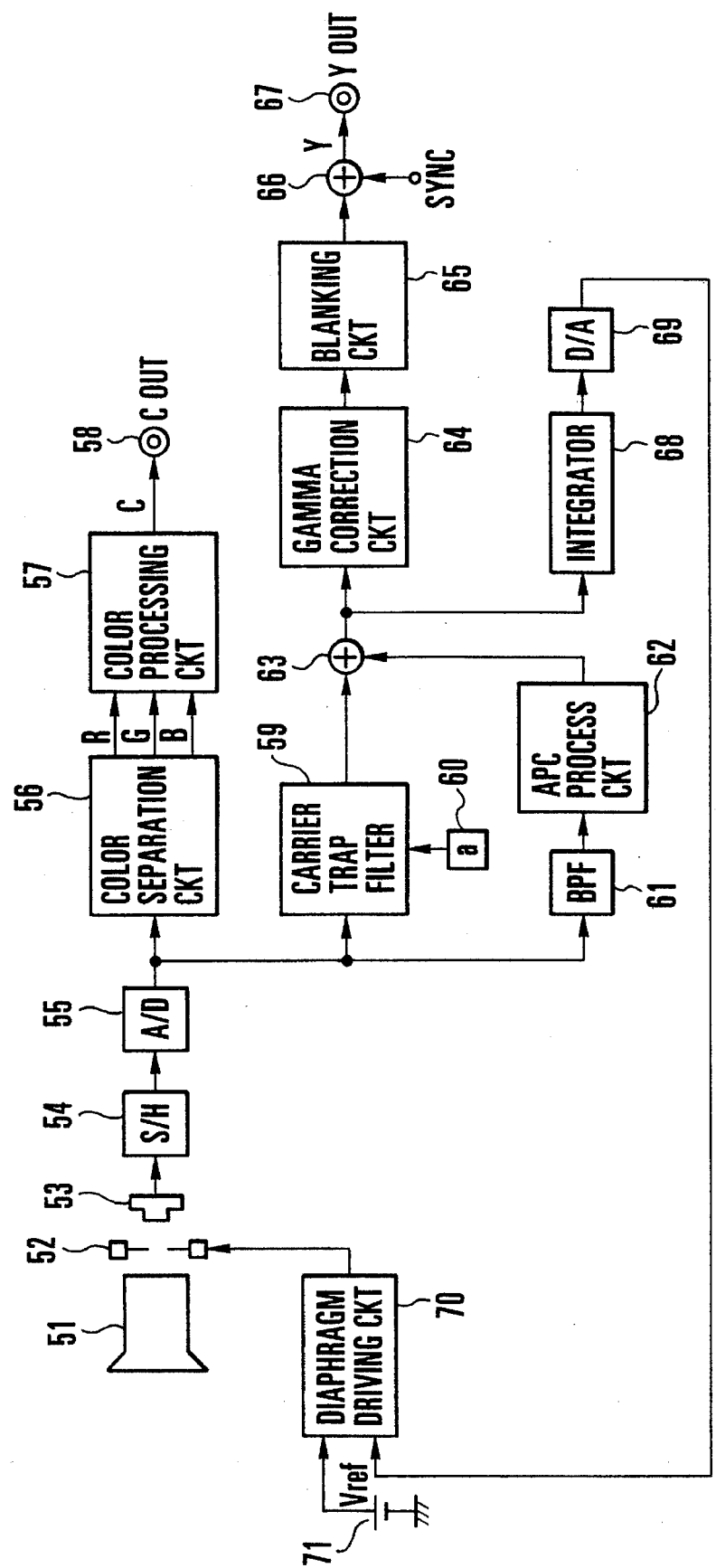
FIG. 9 is a block diagram showing an image pickup apparatus arranged according to this invention as a fourth embodiment thereof.

An image pickup apparatus arranged as a fourth embodiment of this invention is described, with reference to FIG. 9, as follows. FIG. 9 shows the fourth embodiment including an image pickup optical system 51, a diaphragm 52, a color image sensor 53 which is a CCD and has minute color filters formed on its image pickup plane, and a sample-and-hold (S/H) circuit 54 which is arranged to make the output of the CCD 53 continuous.

An A/D converter 55 is arranged to A/D convert the output of the sample-and-hold circuit 54. A color separation circuit 56 is arranged to separate an image pickup signal outputted from the A/D converter 55 into primary color signals for red (R), green (G) and blue (B). A color processing circuit 57 consists of a gain adjustment part, a gamma correction circuit, a color-difference matrix which forms color-difference signals, a blanking circuit and a modulator which modulates the color-difference signals with a color subcarrier. The color processing circuit 57 is thus arranged to form a chrominance signal C.

An output terminal 58 is arranged to output the chrominance signal C. A carrier trap filter 59 is arranged to transmit a luminance component by suppressing a color carrier. A memory 60 is arranged to hold a value "a" which determines the circulation characteristic of the carrier trap filter 59 in the course of signal circulation therein. A band-pass filter (BPF) 61 is arranged to transmit a horizontal contour component. An APC process circuit 62 is arranged to perform gain adjustment and a base clip actions. The embodiment further includes an adder 63, a gamma correction circuit 64, a blanking circuit 65, a synchronizing signal adder 66, a luminance signal output terminal 67, an integrator 68, a D/A converter 69, a diaphragm driving circuit 70 and a reference voltage source 71.

With the image pickup apparatus arranged in this manner, an object image which is not shown is formed on the image pickup plane of the CCD 53 through the image pickup optical system 51 and the diaphragm 52. The object image thus formed is photo-electrically converted on the image pickup plane of the CCD 53. The output of the CCD 53 is supplied to the sample-and-hold circuit 54 to be converted into a continuous signal. The output of the sample-and-hold circuit 54 is supplied to the A/D converter 55 to be converted into a digital image pickup signal.

The digital image pickup signal is supplied first to the color separation circuit 56 to be separated into signals for colors R, G and B. The outputs of the color separation circuit 56 are supplied to the color processing circuit 57 to be subjected to gain adjustment and gamma correction processes. The color processing circuit 57 performs these processes to form color-difference signals R-Y and B-Y. The color-difference signals R-Y and B-Y are subjected to a blanking process and then are modulated into a digital chrominance signal C. The digital chrominance signal C is outputted from the output terminal 58. The digital chrominance signal C is ether supplied to an apparatus such as a TV set or a VTR after a D/A conversion process or supplied as it is to an apparatus having an input for digital signals.

The digital image pickup signal outputted from the A/D converter 55 is supplied also to the carrier trap filter 59 to have a color carrier included in the image pickup signal removed in a characteristic manner according to the value "a" stored in the memory 60. The carrier trap filter 59 then outputs a luminance component. Further, the digital image pickup signal is supplied also to the band-pass filter 61. By the band-pass filter 61, a signal which is approximately of 2 to 6 MHz and is for emphasizing a contour is taken out from the digital image pickup signal. The contour emphasizing signal is supplied to the APC process circuit 62 to be subjected to gain adjustment and base clip actions. The contour emphasizing signal thus processed is supplied to the adder 63 to be added to the luminance component mentioned above.

The output of the adder 63 is supplied to the gamma correction circuit 64 to be subjected to a gamma correction process. The output of the gamma correction circuit 64 is supplied to the blanking circuit 65 to be subjected to a blanking process. The output of the blanking circuit 65 is supplied to the synchronizing signal adder 66 to have a synchronizing signal added thereto. The output of the synchronizing signal adder 66 is supplied to the output terminal 67 to be outputted as a digital luminance signal Y and supplied to an external apparatus together with the digital chrominance signal C.

The signal outputted from the adder 63 is supplied also to the integrator 68 to be integrated, for example, for every vertical scanning period. The output of the integrator 68 is supplied to the D/A converter 69 to be converted into an analog signal. The analog signal is supplied to the diaphragm driving circuit 70 and is compared with a reference voltage Vref outputted from the reference voltage source 71. The diaphragm 52 is controlled according to a difference between the analog signal and the reference voltage Vref found by the comparison.

A route from the diaphragm 52 to the diaphragm driving circuit 70 forms a feedback loop which constantly operates to make the D/A-converted value of the output of the integrator 68 equal to the value of the reference voltage source 71.

Figure 10A:
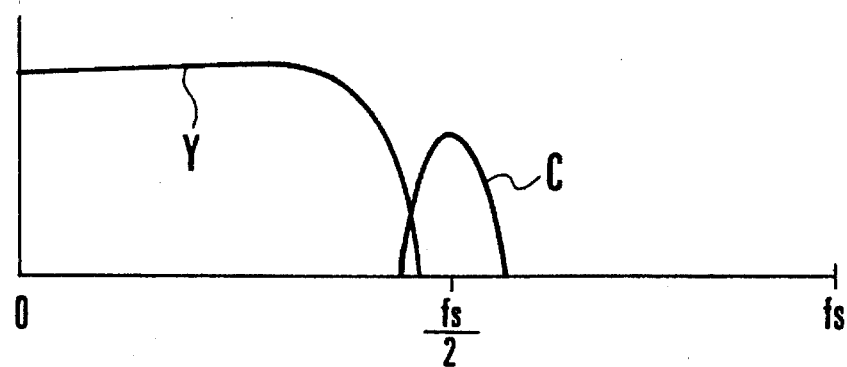
FIGS. 10(a), 10(b) and 10(c) show the operation of the image pickup apparatus shown in FIG. 9.

FIGS. 10(a), 10(b), 10(c), 11(a), 11(b) and 11(c) show the operation of the image pickup apparatus shown as the fourth embodiment in FIG. 9. FIG. 10(a) shows the spectrum of the signal outputted from the CCD 53. In FIG. 10(a), reference symbol fs denotes a frequency at which the CCD is horizontally driven. The frequency fs is also a frequency at which a sampling clock signal is applied to the A/D converter 55.

The luminance signal Y which represents information on the luminance of the object of shooting and the chrominance component C are multiplexed at a frequency determined by the minute color filters arranged on the CCD 53. Since the repeating pitch in the horizontal direction of the minute color filters on the CCD corresponds to two picture elements, according to a method most popular at present, the center frequency of the chrominance component C of the color signal is a frequency of fs/2.

Figure 10B:
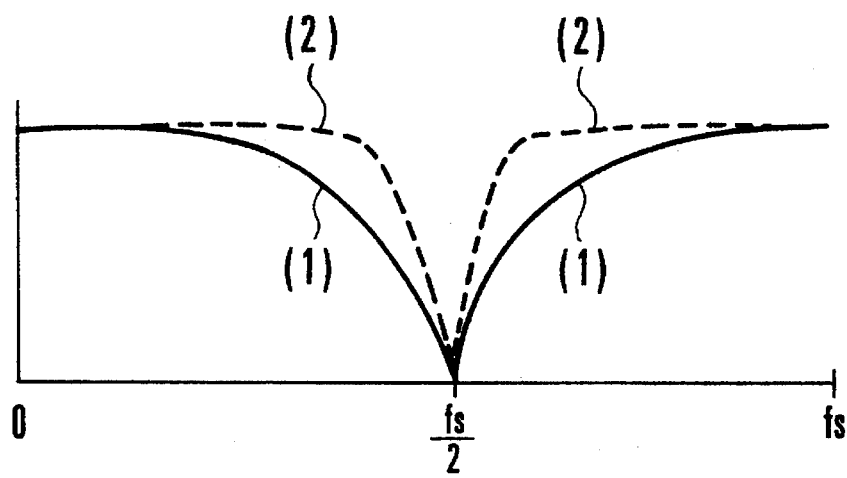

FIG. 10(b) shows the frequency characteristic of the carrier trap filter 59. The frequency fs/2 of the chrominance component C of the color signal is attenuated by this characteristic. Further, a characteristic by which frequencies above the frequency fs/2 are allowed to pass is an aliasing characteristic obtained by a system clock frequency fs. Referring to FIG. 10(b), characteristics (1) and (2) are arranged to be variable according to a value stored in the memory 60.

Figure 10C:
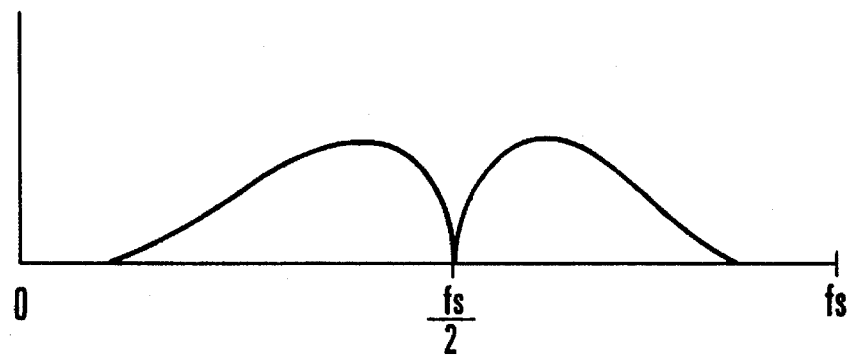

FIG. 10(c) shows the frequency characteristic of the band-pass filter 61. This characteristic allows a frequency band of approximately 2 to 6 MHz to pass and attenuates the frequency fs/2 of the chrominance component C of the color signal.

Figure 11A:
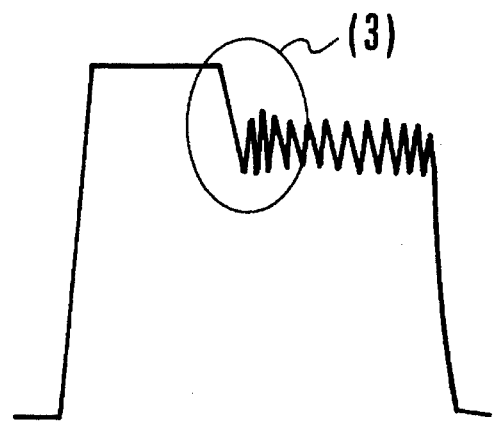
FIGS. 11(a), 11(b) and 11(c) show also the operation of the image pickup apparatus shown in FIG. 9.

FIG. 11(a) shows a waveform of the image pickup signal. In this case, the left side of the waveform represents a white part and has no color carrier. The right side of the waveform represents a colored part and has a color carrier. A part (3) represents a boundary between the white and colored parts.

Figure 11B:
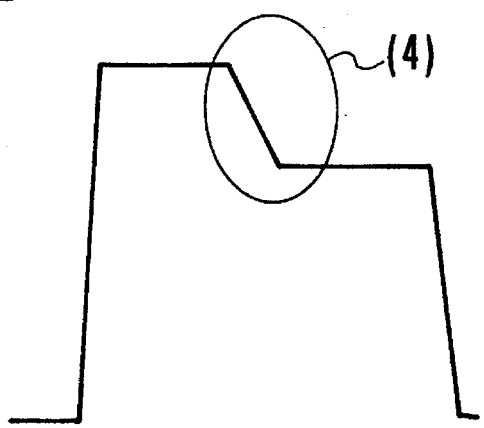

FIG. 11(b) shows the waveform of the output of the carrier trap filter 59 obtained by setting the characteristic of the carrier trap filter 59 at the characteristic (1) as shown in FIG. 10(b). In FIG. 11(b), a part (4) represents a boundary between the above-stated white part and the colored part. At the boundary part (4), the carrier component is suppressed.

Figure 11C:
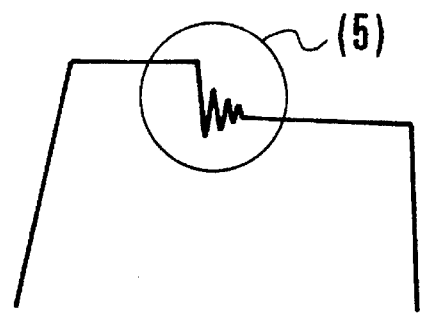

FIG. 11(c) shows the waveform of the output of the carrier trap filter 59 obtained by setting its characteristic at the characteristic (2) as shown in FIG. 10(b). In FIG. 11(c), a part (5) represents a boundary between the above-stated white and colored parts. At the boundary part (5), the carrier component is not completely suppressed and a part of it still remains there.

In view of the variation in characteristic, the characteristic of the carrier trap filter is selected in the following manner. In a case where the output of the image pickup apparatus is connected to a VTR, for example, a band limiting filter having a narrower band than the band of the luminance signal outputted from the image pickup apparatus is inserted in the VTR in most cases. In such a case, a characteristic such as the characteristic (2) of FIG. 10(b) which has a less amount of deterioration in frequency characteristic even if the carrier component somewhat leaks as shown in FIG. 11(c) may be selected as the characteristic of the carrier trap filter 59.

If the output of the image pickup apparatus is connected to a TV monitor, a leak of the carrier component such as the leak shown in FIG. 11(c) would cause a beat noise. In that case, therefore, a characteristic such as the characteristic (1) of FIG. 10(b) which gives no leak of the carrier component as shown in FIG. 11(b) is selected for the carrier trap filter 59.

Further, the characteristic (2) of FIG. 10(b) may be selected in a case where the object of shooting is not colored and the amount of a carrier component is small. The characteristic (1) of FIG. 10(b) may be selected in a case where the object is highly colored and the amount of the carrier component is large.

Figure 12:
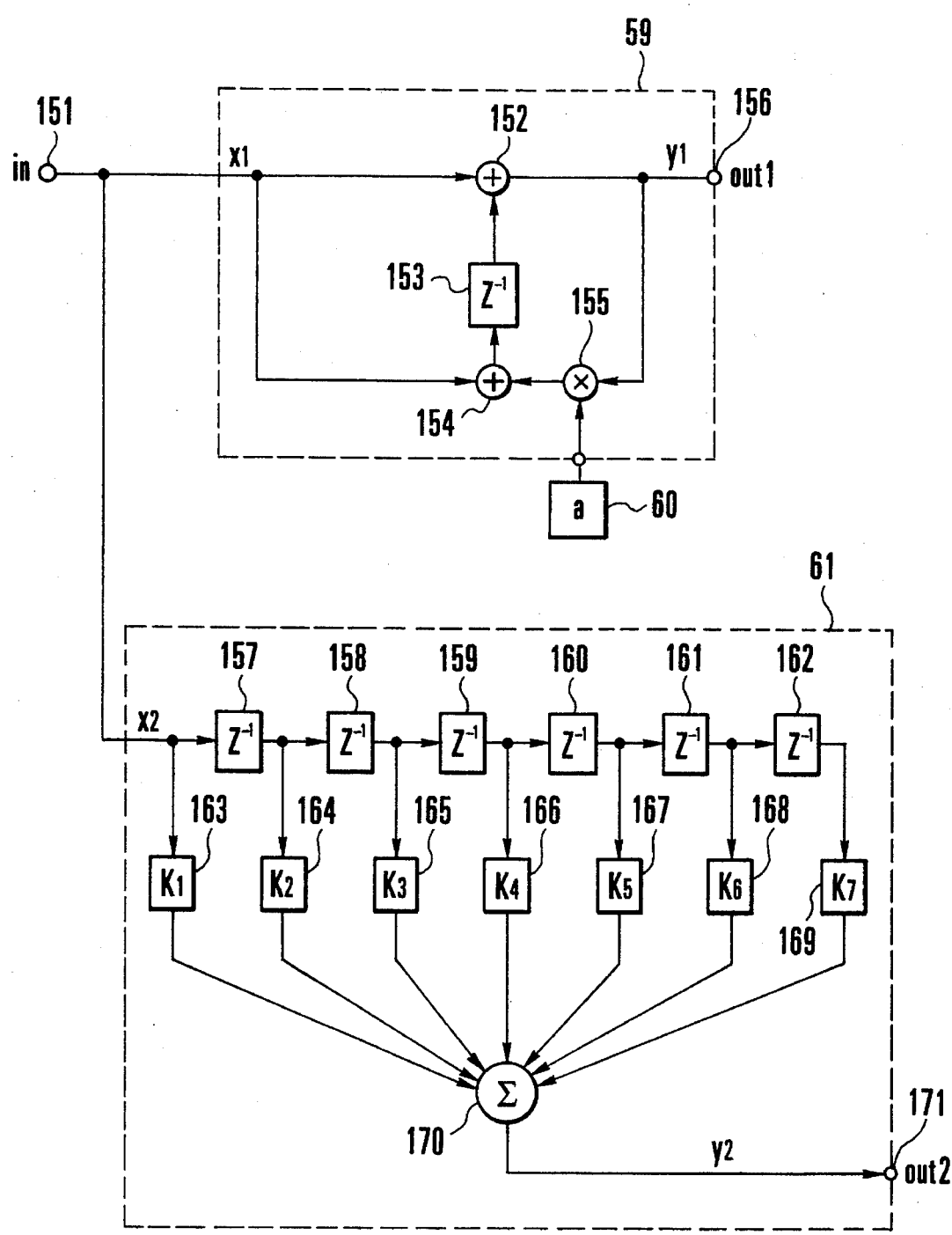
FIG. 12 shows by way of example the details of arrangement of the essential parts of FIG. 9.

FIG. 12 shows by way of example the details of arrangement of the essential parts of the image pickup apparatus shown in FIG. 9 as the fourth embodiment of this invention. In FIG. 12, reference numeral 151 denotes an input terminal. Numerals 152 and 154 denote adders. Numerals 153, 157, 158, 159, 160, 161 and 162 denote delay elements which are respectively composed of D-type flip-flops or the like. Numeral 155 denotes a multiplier. Numeral 156 denotes an output terminal for a luminance component. Numerals 163, 164, 165, 166, 167, 168 and 169 denote coefficient multipliers which respectively have coefficients K1, K2, K3, K4, K5, K6 and K7. Numeral 170 denotes a total sum adder. Numeral 171 denotes an output terminal for a contour component.

As shown, the adders 152 and 154, the delay element 153, the multiplier 155 and the output terminal 156 for the luminance component jointly form the carrier trap filter 59. The delay elements 157 to 162, the coefficient multipliers 163 to 169 and the total sum adder 170 jointly form the band-pass filter 61.

With the image pickup apparatus which is the fourth embodiment arranged in this manner, a digital image pickup signal which is inputted through the input terminal 151 is added at the adder 152 to the output of the delay element 153. The output of the adder 152 is supplied as a luminance component output from the output terminal 156 to the adder 63 mentioned in the foregoing.

The output of the adder 152 is supplied to the multiplier 155 to be multiplied by the value "a" of the memory 60. The output of the multiplier 155 is supplied to the adder 154 to be added to the digital image pickup signal. The output of the adder 154 is supplied to the delay element 153.

The digital image pickup signal inputted is also supplied to the delay elements 157 to 162 to be delayed by these delay elements one after another. The digital image pickup signal inputted and the output signals of these delay elements 157 to 162 are supplied respectively to the coefficient multipliers 163 to 169 to be multiplied by the coefficients K1 to K7. The outputs of the coefficient multipliers 163 to 169 are summed up altogether by the total sum adder 170. The output of the total sum adder 170 is outputted as a contour component from the output terminal 171. The contour component is supplied to the APC process circuit 62.

In the arrangement shown in FIG. 12, with the input of the carrier trap filter 59 assumed to be x1 and its output to be y1, the Z-transformation of the transfer function Hi can be expressed by the following formula:

$$H1\ (Z)=(1+Z^{-1})/(1-a\cdot Z^{-1}) \tag{9}$$

The frequency characteristic of this transfer function can be obtained from the formula by setting "Z" as follows:

$$Z=e^{j\omega\tau} \tag{10}$$

In computing this, the characteristic varies with the value of "a". The characteristic becomes about the same as the characteristic (2) of FIG. 10(b) when "a" is set at −0.5 and about the same as the characteristic (1) of FIG. 10(b) when "a" is −0.9.

Then, at the center frequency f=fs/2, "Z" becomes as expressed below:

$$\begin{aligned} Z &= e^{jp} \\ &= -1\ (\text{wherein } p\text{: circle ratio } (\pi)) \end{aligned} \tag{11}$$

By substituting this for the formula (9), the following formula can be obtained:

$$H1\ (-1)=0 \tag{12}$$

Therefore, the component of fs/2 is not allowed to pass.

Further, at a frequency "0", "Z" becomes as expressed below:

$$\begin{aligned} Z &= e^0 \\ &= 1 \end{aligned} \tag{13}$$

By substituting that for the formula (9), the following formula is obtained:

$$H1\ (1)=2/(1-a) \tag{14}$$

A DC component somewhat varies according to the value of "a". However, within a practical variable range, the value of "a" is set at a value between −0.5 and −0.9 or thereabout. By substituting such a value for the formula (14), there is obtained the following formula:

$$H1\ (1)=1.052\ \text{to}\ 1.333 \tag{15}$$

The range of variation is thus about 12%, which is within an automatically correctable range by carrying out the feedback control over the diaphragm in the manner as mentioned in the foregoing.

Further, variations in dynamic range and in S/N ratio also occur within a sufficiently negligible range. Therefore, it will be understood that, with the characteristic of the carrier trap filter 59 appositely varied, other parts does not have to be readjusted.

Further, with the input signal of the band-pass filter 61 assumed to be x2 and its output signal to be y2, the Z-transformation of the transfer function H2 can be expressed by the following formula:

$$H2(Z) = K1 + K2 \cdot Z^{-1} + K3 \cdot Z^{-2} + K4 \cdot Z^{-3} + K5 \cdot Z^{-4} + K6 \cdot Z^{-5} + K7 \cdot Z^{-6} \quad (16)$$

Then, with the values of the coefficients K1 to K7 assumed to be K1=K7=1, K2=K6=−2, K3=K5=−1 and K4=4, the following formula can be obtained:

$$H2(Z) = 1 - 2 \cdot Z^{-1} - Z^{-2} + 4 \cdot Z^{-3} - Z^{-4} - 2 \cdot Z^{-5} + Z^{-6} \quad (17)$$

A frequency characteristic is computed with "Z" in the formula (17) set as follows in the same manner as described in the foregoing:

$$Z = e^{j\omega\tau} \quad (18)$$

The frequency characteristic thus computed is about the same as the characteristic shown in FIG. 10(c).

Then, at the center frequency f=fs/2 of the chrominance component, if "Z" is set at Z=−1 in the same manner as described in the foregoing, a value of "Z" to the power of an odd number becomes "−1" and a value of "Z" to the power of an even number becomes "1".

The transfer function H2 obtained in this manner can be expressed by the following formula:

$$H2(-1) = 1 + 2 - 1 - 4 - 1 + 2 + 1 = 0 \quad (19)$$

Therefore, the frequency component of fs/2 is not allowed to pass.

With the band-pass filter 61 for detecting the horizontal contour component arranged to be an FIR filter as shown in FIG. 12, the value of the transfer function can be easily made zero by setting Z=−1 as mentioned above. The arrangement, therefore, obviates the necessity of inserting any special filter for the purpose of removing the chrominance component.

Further, in the arrangement of FIG. 12, "1" or "2" and "4" are used as the coefficient of the formula (17). In the case of "1", no coefficient multiplier is necessary in actuality. In a case where "2" and "4" are used, a shift computing operation by bit shifting also permits omission of the coefficient multiplier. Therefore, the scale of the circuit can be reduced to a great extent.

Besides, the arrangement eliminates any error of a coefficient, ringing which solely results from a distortion of a frequency characteristic or a phase characteristic due to place cancelling in the signal, a beat noise resulting from insufficient suppression of the chrominance carrier and other deterioration in picture quality. The coefficients used for the circuit arrangement are not limited to those mentioned above but include also other values obtained from a value of "1" or "2" to the power of an "n" number or from a suitable combination of them. The use of such coefficients enables the embodiment to have a large amount of attenuation at the frequency of fs/2 and also permits reduction in the scale of the circuit arrangement.

Since the phase characteristic of the carrier trap filter 59 which transmits the luminance component is not even, detection of a contour signal by using the output of the carrier trap filter 59 would result in image deterioration due to ringing, etc. In the case of the arrangement shown in FIG. 12, therefore, the contour signal is detected by means of an FIR filter disposed before the carrier trap filter, so that this problem can be solved.

Figure 13:
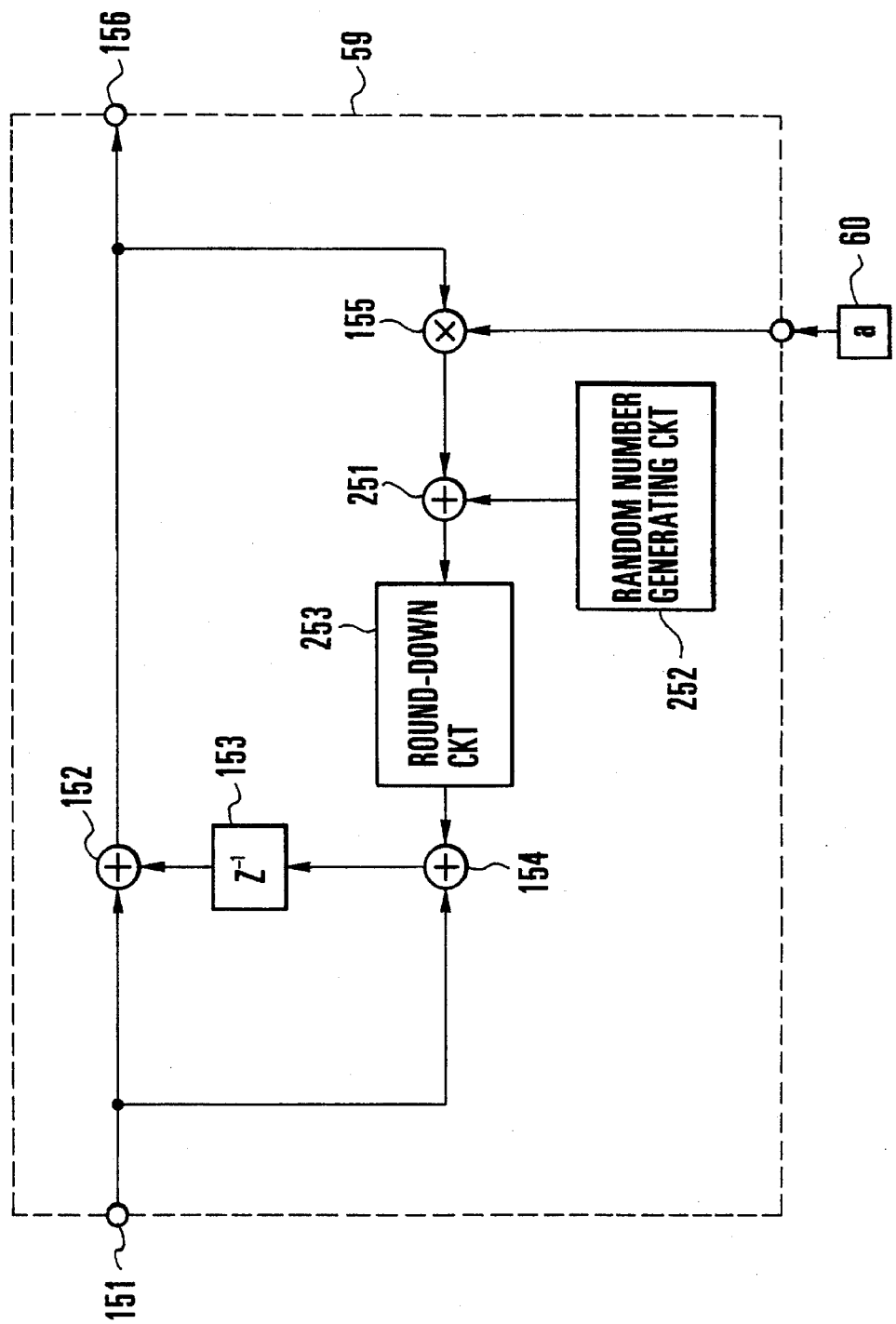
FIG. 13 shows another example of the details of arrangement of the essential parts of FIG. 9.

FIG. 13 shows, as another example, the details of essential parts included in FIG. 9. In FIG. 13, the same reference numerals as those shown in FIG. 12 denote the same parts or parts corresponding to them. The parts shown in FIG. 13 include an adder 251, a random number generating circuit 252 and a round-down circuit 253.

With the image pickup apparatus arranged as shown in FIG. 13, the digital image pickup signal inputted through the input terminal 151 is supplied to the adder 152 to be added to the output of the delay element 153. The output of the adder 152 is outputted as a luminance component from the output terminal 156 to be supplied to the adder 63 which is shown in FIG. 9.

Further, the output of the adder 152 is supplied also to the coefficient multiplier 155 to be multiplied by a value "a" stored in the memory 60. The output of the coefficient multiplier 155 is supplied to the adder 251 to be added to a random number outputted from the random number generating circuit 252. The output of the adder 251 is supplied to the round-down circuit 253 to have any fraction below the decimal point rounded off. The output of the round-down circuit 253 is supplied to the adder 154 to be added to the digital image pickup signal. The output of the adder 154 is inputted to the delay element 153.

The random number generating circuit 252 is arranged to uniformly generate random numbers from "0" to "1". When the average value of the random numbers generated becomes "0.5", a rounding action is carried out in an averaging manner through the adder 251 and the round-down circuit 253. By this, the energy of an oscillating phenomenon (a limit-cycle oscillation) that tends to occur in a case where the adders 152 and 154, the delay element 153 and the coefficient multiplier 155 are formed with a limited number of bits is effectively dispersed, so that any image deterioration on the visual sensation due to ringing, etc., can be mitigated. This advantage is salient particularly when the coefficient "a" is close to "−1".

In accordance with this invention, as described in the foregoing, a digital signal processing circuitry can be formed without cascade-connecting the luminance component detecting filter and the contour component detecting filter to each other. Therefore, the invented arrangement effectively prevents any image deterioration that results from errors due to place cancelling of the signal from easily taking place. The circuit delay time can be minimized. The apparatus can be simply arranged for reduction in electric energy consumption. The circuit scale can be reduced to facilitate adoption of an integrated circuit arrangement.

A further advantageous feature of this invention lies in that the frequency characteristic of the carrier trap filter is arranged to be variable, so that a frequency characteristic most apposite to the conditions of shooting, to the object of shooting or to the apparatus connected to the embodiment of this invention, can be selected as desired. Besides, in changing the frequency characteristic of the carrier trap filter, the setting of any other element does not have to be readjusted.

What is claimed is:

1. An image pickup apparatus comprising:
    a first filter arranged to obtain a luminance signal by suppressing a chrominance component of a digital image pickup signal formed by analog-to-digital converting a signal outputted from a color image sensor; and a second filter arranged to obtain a contour component of the digital image pickup signal, to have a characteristic of suppressing the chrominance component and to receive the image pickup signal concurrently with receipt thereof by said first filter.

2. An image pickup apparatus comprising:

a diaphragm arranged to control the quantity of light incident on a color image sensor;

a carrier trap filter arranged to obtain a luminance signal by suppressing a chrominance component of a digital image pickup signal formed by analog-to-digital converting a signal outputted from said color image sensor; and diaphragm control means for controlling said diaphragm to stabilize the level of the luminance signal by using an output of said carrier trap filter.

3. An apparatus according to claim 2, wherein said carrier trap filter is of a circulation type, and wherein a circulation characteristic of said carrier trap filter is arranged to be variable by varying a coefficient of said carrier trap filter.

4. An apparatus for use in generating a luminance signal component of a digital color image signal having mixed luminance and color components, comprising:

a first filter receiving said digital color image signal and outputting a first signal indicative of said luminance component by suppressing the color component of the received digital color image signal; and a second filter receiving said digital color image signal and outputting a second signal indicative of a contour component of the received digital color image signal, said second filter receiving said digital color image signal in condition not filtered by said first filter.

5. An apparatus according to claim 4, wherein said second filter has a characteristic of suppressing the color component of the received digital color image signal.

6. An apparatus according to claim 4, further including adding circuitry for outputting a third signal having content corresponding to contents of said first and second signals.

7. An apparatus according to claim 5, further including circuitry receiving said second signal and performing gain adjustment and base clipping actions thereon.

8. An apparatus according to claim 6, including further adding circuitry for outputting a fourth signal having content corresponding to content of said third signal and a synchronizing signal.

9. An apparatus according to claim 8, further including correcting circuitry receiving said third signal and performing gamma correction action thereon.

10. An apparatus according to claim 9, further including blanking circuitry receiving an output signal of said correcting circuitry and performing a blanking action thereon.

11. An image pickup apparatus, comprising:

(a) image sensor means for sensing an image and providing a digital color image signal having mixed luminance and color components and including (1) an image sensor having a plurality of sensing pixels in an image sensing plane thereof and having color filters, each facing a distinct plurality of n pixels and (2) drive means for driving said image sensor at a frequency fs for readout of said image sensor; and (b) a bandpass filter receiving said digital color image signal, said filter providing an output signal indicative of a contour of said digital color image signal and having a band suppression characteristic centered at a frequency of fs/n.

12. An apparatus according to claim 11, further including a low pass filter receiving said digital color image signal, suppressing the color component and providing an output signal indicative of the luminance component thereof.

13. An apparatus according to claim 12, further including adding circuitry for outputting a signal having content corresponding to contents of said output signals of said bandpass and low pass filters.

14. An apparatus according to claim 13, further including signal processing circuitry receiving said output signal of said bandpass filter and performing gain adjustment and base clipping actions thereon.

15. An apparatus according to claim 13, including further adding circuitry for outputting a signal having content corresponding to content of said adding circuitry output signal and a synchronizing signal.

16. An apparatus according to claim 15, further including correcting circuitry receiving said third signal and performing gamma correction action thereon.

17. An apparatus according to claim 16, further including blanking circuitry receiving an output signal of said correcting circuitry and performing a blanking action thereon.

* * * * *